United States Patent [19]

von Bieren

[11] Patent Number: 4,552,435
[45] Date of Patent: Nov. 12, 1985

[54] PHASE GRATING PULSE STACKER

[75] Inventor: Karlheinz von Bieren, Camarillo, Calif.

[73] Assignee: Rockwell International Corporation, El Segundo, Calif.

[21] Appl. No.: 557,703

[22] Filed: Dec. 2, 1983

Related U.S. Application Data

[63] Continuation-in-part of Ser. No. 248,930, Mar. 30, 1981, abandoned.

[51] Int. Cl.[4] .............................................. G02B 27/10
[52] U.S. Cl. .................................................... 350/169
[58] Field of Search .............. 350/169, 162.17, 162.19, 350/162.2, 162.22, 162.23

[56] References Cited

U.S. PATENT DOCUMENTS

| | | | |
|---|---|---|---|
| 3,845,409 | 10/1974 | Wada et al. | 350/162.23 |
| 3,861,801 | 1/1975 | Peters et al. | 350/162.23 |
| 4,079,382 | 3/1978 | Henry | 350/162.22 |
| 4,114,978 | 9/1978 | Bostick et al. | 350/169 |
| 4,277,138 | 7/1971 | Dammann | 350/169 |

Primary Examiner—Bruce Y. Arnold
Attorney, Agent, or Firm—H. Frederick Hamann; Harry B. Field

[57] ABSTRACT

The present invention is an apparatus for combining pulsed or continuous laser beams into a single coherent output beam wherein the laser beams to be combined are directed to intersect at the surface of a sinusoidal phase grating so that each are diffracted into sets of diffracted beams, the first laser beam striking the sinusoidal phase grating from a first angle of incidence and the other laser beam striking it from an angle of incidence which is the negative of the first. The sinusoidal phase grating features a modulation wavelength which causes a preselected order from each resultant set of diffracted beams to propagate in a direction normal to the sinusoidal phase grating and a modulation depth which maximizes the energy distributed into the normally directed, preselected diffraction order. All other orders are suppressed.

13 Claims, 8 Drawing Figures

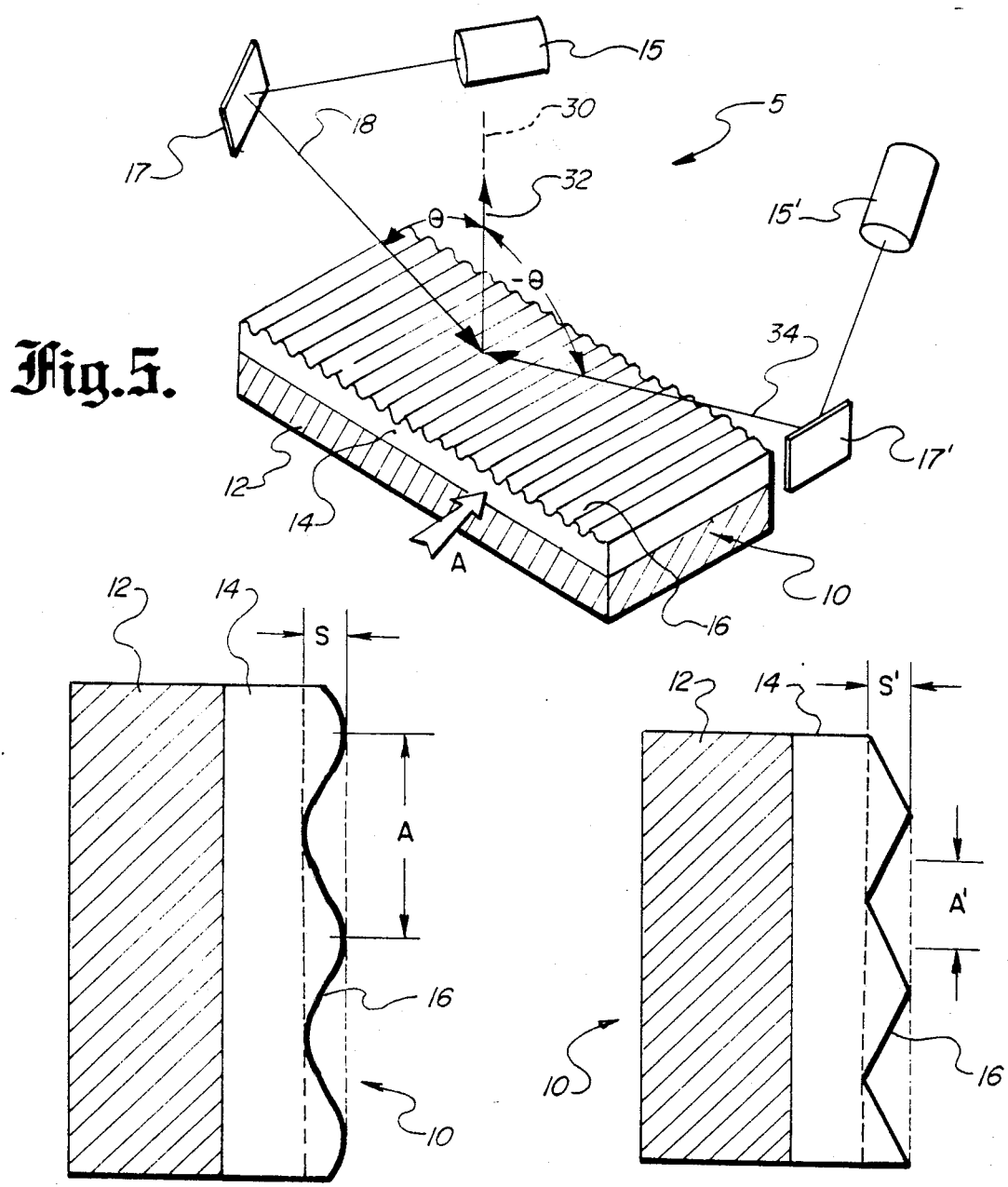
Fig.5.
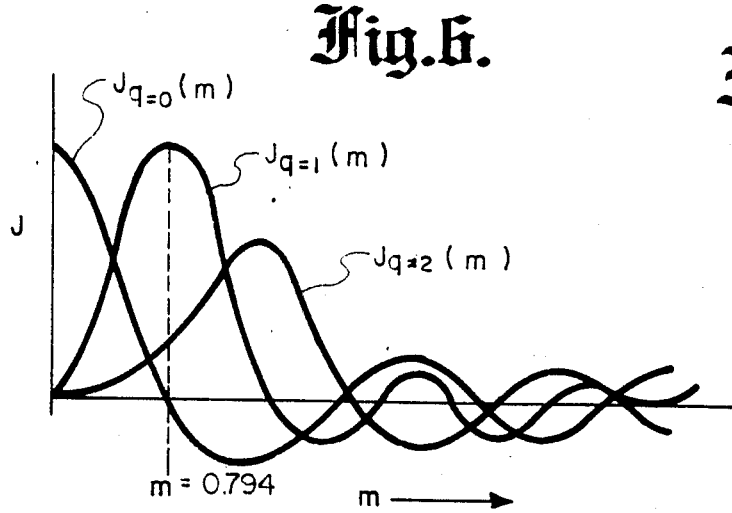
Fig.6. Fig.7.
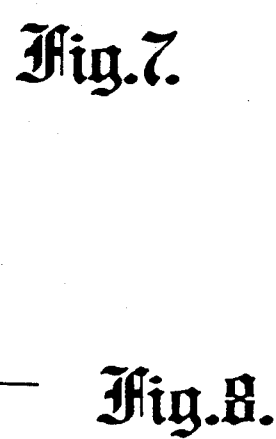
Fig.8.

PHASE GRATING PULSE STACKER

This application is a continuation-in-part of copending application Ser. No. 248,930, filed on Mar. 30, 1981, and abandoned on 4/4/84.

BACKGROUND OF THE INVENTION

1. Field of the Invention

The invention relates to an apparatus to multiplexing several laser beams into one spatially coherent beam.

2. Description of the Prior Art

Because there are practical limits to the pulse power from a single laser as well as limits to the pulse rates that can be achieved, it is desirable to combine beams from a plurality of separate laser sources into a single beam. Devices for combining beams from a number of sources or for splitting beams from a signle source have generally employed beam splitters of semi-reflecting plates. In the case of beam combining systems, such a plate is used to reflect one beam along a path while allowing a beam from a second source to be transmitted through the plate along the same path. Such devices, however, are inefficient in that the beam splitter cannot reflect all the energy from the one source and transmit all the energy from the other source in combining the two beams. Such devices are especially inefficient when the two beams being combined have equal polarization. Other devices use a series of rotating mirrors or a rotating arcuate mirror surface to combine the pulses; however, these devices tend to degrade the far field irradiance by smearing the beam on the target. Furthermore, their moving parts require accurate alignment, and the devices cannot superimpose continuous beams. Examples of these devices include U.S. Pat. No. 4,154,507 and Japanese Pat. No. 52-11894.

SUMMARY OF THE INVENTION

The present invention is an apparatus for combining pulsed or continuous laser beams into a single coherent output beam wherein the laser beams to be combined are directed to intersect at the surface of a sinusoidal phase grating so that each are diffracted into sets of diffracted beams, the first laser beam striking the sinusoidal phase grating from a first angle of incidence and the other laser beam striking it from an angle of incidence which is the negative of the first. The sinusoidal phase grating features a modulation wavelength which causes a preselected order from each resultant set of diffracted beams to propagate in a direction normal to the sinusoidal phase grating and a modulation depth which maximizes the energy distributed into the normally directed, preselected diffraction order. All other orders are surpressed. As a result, the incident laser beams are combined into a single coherent output beam with a substantial conservation of their energies.

OBJECTS OF THE INVENTION

Therefore, an object of the present invenion is to provide an apparatus for combining two or more pulsed or continuous laser beams into a single output beam.

It is still another object of the present invention to provide an efficient beam combiner which can combine two or more beams with a susbstantial conservation of their energies.

Yet another object of the present invention is to provide an apparatus for combining two or more pulsed or continuous laser beams into a single output beam without involving any moving parts.

It is still another object of the present invention to provide a beam combiner which is both capable and efficient in combining beams which have equal polarization and/or are continuous.

Further objects, advantages and novel features of the present invention will become apparent from the following detailed description of the invention when considered in conjunction with the accompanying drawings.

BRIEF DESCRIPTION OF THE DRAWINGS

FIG. 5 is a perspective view of a laser system utilizing the phase grating of FIG. 1 for the purpose of combining the output of several individual lasers.

FIG. 6 is a greatly enlarged, sectional side view showing the parameters which describe the modulation profile of the phase grating shown in FIG. 1.

FIG. 7 is a greatly enlarged, sectional side-view of another embodiment of the present invention wherein a triangular surface modulation is employed.

FIG. 8 is a graphical representation of Bessel functions $J_q$ versus m for selected orders of diffraction q.

DESCRIPTION OF THE PREFERRED EMBODIMENTS

Figure 1:
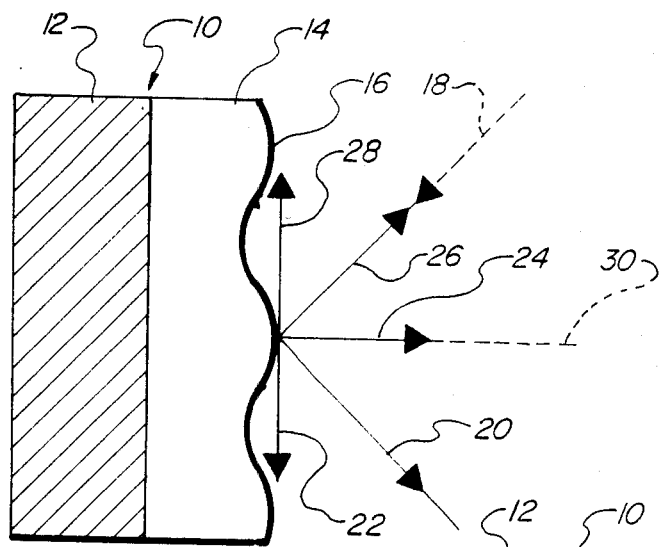
FIG. 1 is a greatly enlarged, sectional side-view of a phase grating constructed according to the preferred embodiment of the present invention with an incident wave striking the phase grating and diffracting into several diffracted waves.
Figure 2:
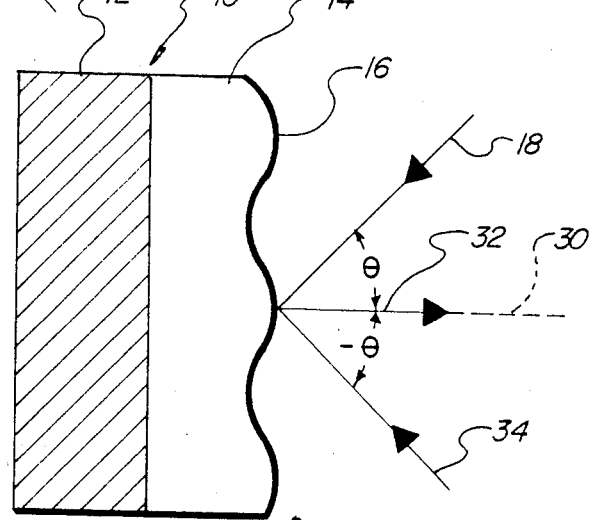
FIG. 2 is a greatly enlarged, sectional side-view showing two incident waves striking the section of the phase grating shown in FIG. 1 to create an output diffracted wave.

Referring to FIG. 5, the present invention provides a phase grating pulse stacker comprising a phase grating, generally designated 10, which has a substrate 12 and a layer 14 which are constructed from material typically used in the construction of gratings. Layer 14 is preferably constructed from a high reflective material such as silver, copper, or nickel, which is bonded on the substrate 12. Outer surface 16 of layer 14 is formed typically by a holographic exposure in conjunction with ion edging to create a sine-wave shape. The sinusoidal shape of surface 16 is also shown in FIGS. 1 and 2 wherein a cross-sectioned portion of phase grating 10 is taken in the direction of arrow designated A in FIG. 5 and then greatly enlarged. Referring back to FIG. 5, phase grating 10 is particularly useful as a part of a laser system 5 which further comprises lasers 15 and 15' and mirrors 17 and 17', the mirrors serving to direct beams 18 and 34 to strike surface 16 of phase grating 10 at angles of incidence $\Theta$ and $-\Theta$, respectively. In such a system, phase grating 10 serves to combine beams 18 and 34 into a single coherent output beam 32 in a manner which conserves the energies of beams 18 and 34.

The spectrum of phase gratings, in general, is a line spectrum which extends from minus to plus infinity. If the grating is of finite extent, each line is convolved with a sinc-function (maxima designated by the order m, where m=0, ±1, ±2, etc.) which is representative of the size of the grating. Through proper choice of a modulation profile or depth and modulation groove spacing or wavelength of the phase grating relative to the wavelength of the radiation incident on and diffracted off the grating, it is possible to suppress all diffracted orders, including the zero order term, except for the first order (+1) diffracted term.

Referring to FIG. 1, there is shown a first incident plane wave 18 striking surface 16 of phase grating 10 at an angle of incidence Θ whereat wave 18 is diffracted into a set of ordered diffracted beams: a 0 order wave 20 (reflected), a −1 order wave 22, a +1 order wave 24, a +2 order wave wave 26 back into the incident beam, and a +3 order wave 28. Through proper selection of a modulation wavelength A for sinusoidal surface 16 (see FIG. 6), a preselected order such as the first order wave 24 can be caused to propagate in a direction normal to phase grating 10 as represented by dashed normal line 30. Then through proper selection of a modulation depth S for sinusoidal surface 16 (see again FIG. 6), it is possible to affect the energy distributed amongst the diffracted orders such that the greatest portion is distributed into the preselected, normally propagating order, which is here the first order wave 24, to the extent that the remaining orders are suppressed. In the preferred embodiment, the 0 order wave 20 and +2 order wave 26 is minimized and the +1 order wave 24 is maximized with an efficiency greater than 90%.

Referring to FIGS. 1 and 5, it is to be noted that the orientation of normal 30 is determined according to well-established practice in connection with the determination of normals for purposes of defining angles of incidence with respect to phase gratings in general. Thus, normal 30 is not determined according to an analysis of what would be a perpendicular direction with respect to any given point along the indulations of surface 16, but instead is determined with respect to surface 16 taken as a whole. Thus, in the instance that phase grating 10 is constructed with a curved form instead of a flat one, normal 30 would be determined with respect to a plane tangent to surface 16 at the point of incidence of beams 18 and 34 in accordance with the aforementioned standard practice. Furthermore, it is to be understood that beamns 18, 34 and 32 and normal 30 preferably lie within a plane whose intersection with surface 16 shows the true sinusoidal modulation of surface 16.

Referring now to FIG. 2, first incident plane wave 18 strikes phase grating 10 under the angle of incidence Θ relative to normal 30 of phase grating 10 and its first order diffracted wave 32 is caused to propagate in the direction of normal 30 as previously discussed with respect to FIG. 1. Since the first phase grating 10 is symmetrical with respect to the normal 30, a second incident plane wave 34 striking phase grating 10 at the same location but an opposite angle of incidence −Θ will have its first order diffracted wave 32 also propagate into the direction of normal 30 as occurred with first incident plane wave 18. Thus, depending upon timing of the pulses of first incident plane wave 18 and second incident plane wave 34, simultaneous or serial stacking of the pulses from two lasers may be accomplished.

Figure 3:
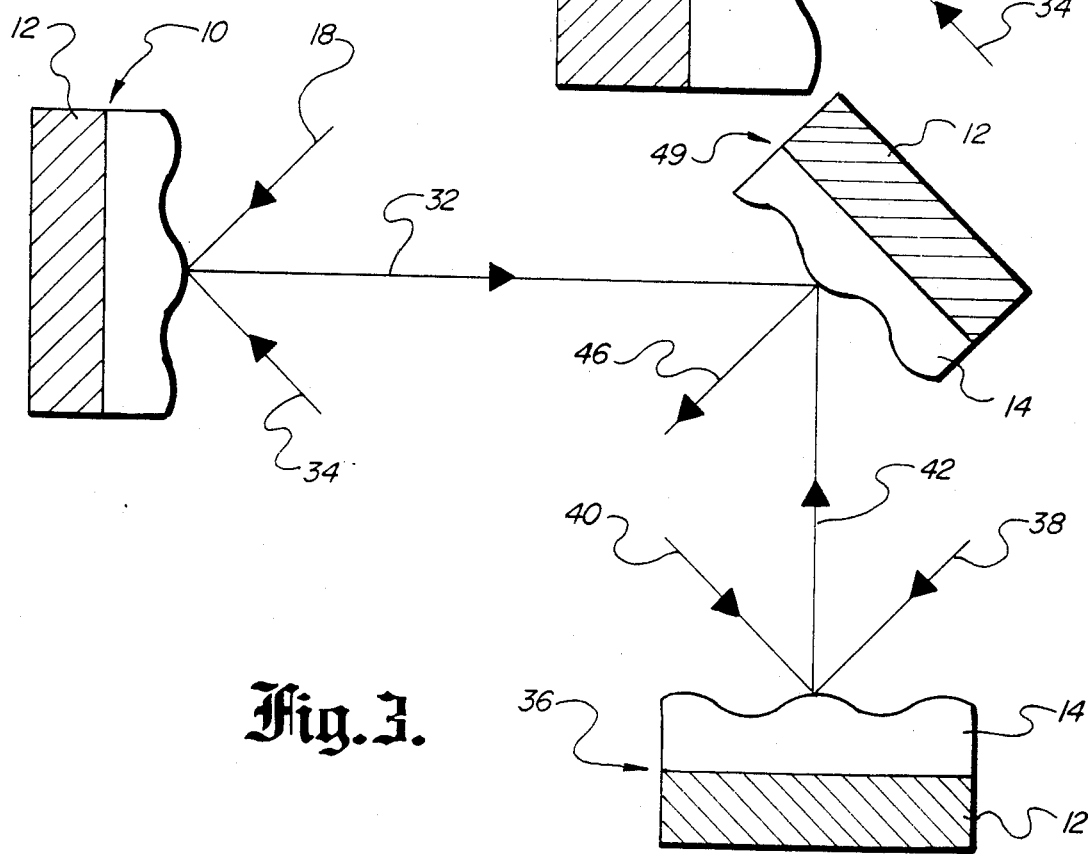
FIG. 3 is a greatly magnified diagram of four incident waves striking three phase gratings resulting in one output diffracted wave.

The stacking of more than two laser beams may be accomplished by repetitive application of additional phase gratings as shown in FIG. 3. A second phase grating 36, similar in construction to first phase grating 10, is placed so as to receive a third incident plane wave 38 and a fourth incident plane wave 40, creating a second diffracted plane wave 42. A third phase grating 49, similar in construction to the first phase grating 10 and the second phase grating 36, is placed so as to receive the first diffracted plane wave 32 and the second diffracted plane wave 42, creating a third diffracted plane wave 46. Thus, depending upond temporal relationship between the first, second, third, and fourth incident plane waves (18, 34, 38 and 40, respectively), simultaneous or serial stacking of the pulses of four lasers may be accmplished. Additional beams may be added in the same manner.

The following description explains how the modulation profile of phase grating 10 is selected. Referring to FIG. 6, the surface function f(x) of the sinusoidal phase grating may be represented by $$f(x) = \frac{S}{2} \sin 2\pi \frac{x}{A} \quad (1)$$

where x is the running coordinate across the surface, A is the wavelength of the surface function and S/2 is the amplitude of the surface.

A plane wave incident on this surface under the angle Θ will experience a spatial phase modulation process upon reflection off this surface, resulting in the function $\phi_1(x)$ (spatial description only)

$$\phi_1(x) = e^{j \frac{2\pi}{\lambda} (x \sin \theta + S \sin 2\pi \frac{x}{A})} \quad (2)$$

where Θ is the angle of incidence of the incident beam. In general, the wave distribution in the Fraunhofer domain is of interest. Consequently, the Fourier transform of Eq. (2) delivers the following angular spectrum $\phi_2(''')$ (wherein Θ' the angle of diffraction such that Θ'=0 is in the direction of normal 30):

$$\phi_2(\theta') = \int_{-\infty}^{+\infty} e^{j \frac{2\pi}{\lambda} [x \sin \theta + S \sin 2\pi \frac{x}{A} + x \sin \theta']} dx \quad (3)$$

In order to perform the integration process, the following relationship, which is due to Jacobi, is introduced:

$$e^{jm \sin 2\pi f t} = \sum_{q=-\infty}^{+\infty} J_q(m) e^{j 2\pi q f t} \quad (4)$$

wherein $J_q$ is the Bessel function of the first kind, order q, and m equals $2\pi S/\lambda$. Equation (3) may now be expressed by $$\phi_2(\theta') = \quad (5)$$

$$\sum_{q=-\infty}^{+\infty} J_q\left(\frac{2\pi s}{\lambda}\right) \int_{-\infty}^{+\infty} e^{j \frac{2\pi}{\lambda} [x \sin \theta + x \sin \theta' + \frac{\lambda x}{A}]} dx$$

Integration of Eq. (5) can now be performed, with the following result:

$$\phi_2(\theta') = \sum_{q=-\infty}^{+\infty} J_q\left(\frac{2\pi s}{\lambda}\right) \delta\left[\sin\theta + \sin\theta' + \frac{q\lambda}{A}\right] \quad (6)$$

Since q can be any integer, the grating equation, expressed by the Dirac delta function argument becomes:

$$\sin \theta + \sin \theta' = q \frac{\lambda}{A} \quad (7)$$

This grating operation determines the diffraction terms which must be considered. Since we wich a selected order q to be directed along normal 30, sin Θ' equals zero and we derive:

$$A = q(\lambda/\sin \Theta) \quad (8)$$

Thus if it is chosen that q=1 and Θ=45° as is done in the preferred embodiment of the present invention, the wavelength modulation A of sinusoidal phase grating 10 is determined by:

$$A = \sqrt{2} \, \lambda = 1.414\lambda$$

The modulation depth S of phase grating 10 must now be selected such that the energies directed into 0 order diffracted wave 20 (q=0) and +2 order diffracted wave 26 (q=+2) are small in comparison to the energy directed into the +1 order wave 24 (q=+1). This step is accomplished by far-field analysis of each Bessel function Jq for each q of interest against a range of values for m ($=2\pi S/\lambda$). FIG. 8 shows a plot of such analysis of a sinusoidal phase grating 10 utilizing an angle of incidence Θ=45°. As can be seen, at a value of m=10.794 a significant proportion of the total energy is distributed into the first diffracted order (q=+1). The results achieved are tabulated in Table I below.

TABLE I

| Diffracted Order | q = 0 | q = 1 | q = 2 |
|---|---|---|---|
| Diffracted Energy | 1.3% | 92.6% | 5.85% |

Thus, in combining first incident wave 18 and second incident plane wave 34, phase grating 10 provides a single output beam comprising the serial or simultaneous stacking of the first diffracted orders of those waves with a substantial conservation of their energies.

Whereas the preferred embodiment of phase grating 10 features sinusoidal surface 16, it is to be understood that other forms of surface modulation can be utilized to equal effectiveness. For instance, surface 16 could be formed so that its cross-section presents a series of isosceles triangles having a modulation wavelength A' and a modulation depth S' as shown in FIG. 7. In this embodiment, the determination of A' and S' is performed in substantially the same analytical manner as with the sinusoidal embodiment, the difference being that the surface function f(x) would involve a Fourier series representation of the triangular shape of the surface modulation (compare equation (1)). Likewise, surface 16 could be given a trapezoidal modulation or any other geometric form which presents the same surface modulation to beams striking surface 16 either from an angle of incidence Θ or from an angle of incidence −Θ.

Figure 4:
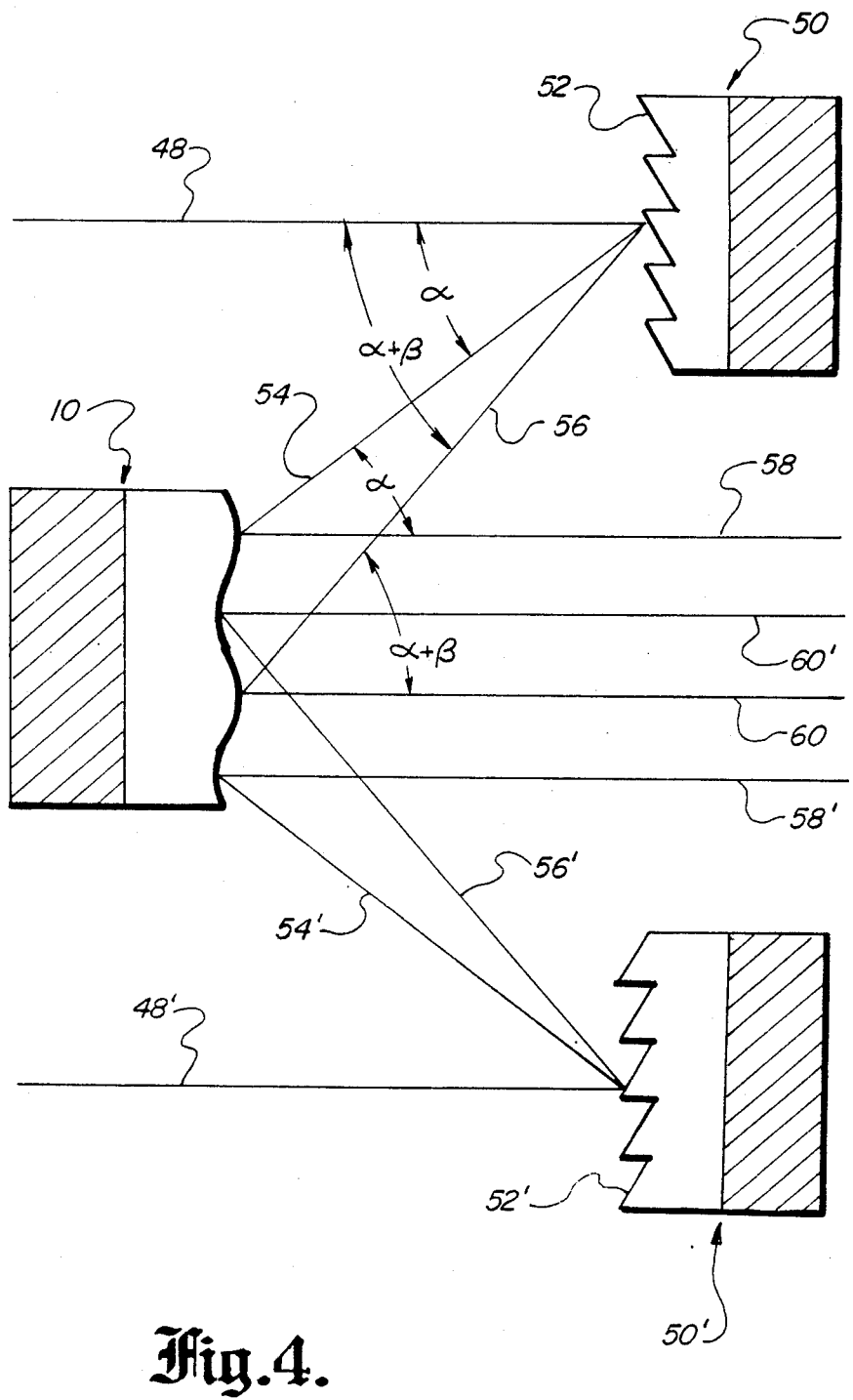
FIG. 4 is a greatly magnified diagram of chromatic beams striking phase gratings to be combined thereby in accordance with the practice of the present invention.

If the laser beams to be combined include more than one wavelength, the phase gratings may be achromatized. Referring to FIG. 4, a dual wavelength beam 48 (for example) is incident upon and diffracted from a blazed grating 50. The blazed grating 50 is constructed similar to the first phase grating 10, except for the beam diffracting surface 52 which is saw-tooth shaped. Any diffracted beams from the blazed grating are then incident upon and diffracted from the first phase grating 10. The angle α of any diffracted wave is strongly dependent upon the wavelength of radiation incident upon the grating. Therefore, if the radiation covers a finite spectrum, the diffracted wavefronts are no longer coincident with the surface normal because of the dispersion property of the grating. The radiation associated with the longer wavelength now diffracts through a larger angle α+β on the blazed grating 48 as well as on the first grating 10. Therefore, the application of a dual wavelength beam 48 onto the blazed grating 50 results in a short wavelength wavefront 54 and a long wavelength 56 incident upon the first phase grating 10. In this fashion it can be seen that blazed grating 50 is optically aligned with phase grating 10 and has a beam diffracting surface 52 which results in wavefronts 54 striking phase grating 10 at their own characteristic angles α and α+β with respect to normals to first phase grating 10. The angle between the short wavelength wavefront 54 and the dual wavelength beam 48 is α, and the angle between the long wavelength wavefront 56 and the dual wavelength beam 48 is α+β. The short wavelength wavefront 54 diffracts off the first phase grating 10 at angle α and the long wavelength wavefront 56 diffracts at angle α+β; therefore, the diffracted short wavefront first order 58 and the diffracted long wavefront first order 60 are parallel but displaced as they come off of the first phase grating 10. It is to be understood that an equivalent blazed grating 50' would be positioned in complementary fashion with respect to blazed grating 50 and would function in equivalent fashion to produce beams 54', 56', 58' and 60' from second dual wavelength beam 48'.

Obviously, many modifications and variations of the present invention are possible in light of the above teachings. It is therefore to be understood that, within the scope of the appended claims, the invention may be practiced otherwise than as specifically described.

What is claimed and desired to be secured by Letter Patent of the United States is:

1. An apparatus for combining first and second beams of substantially equal wavelength λ, said apparatus comprising a phase grating and means for directing said first and second beams to strike said phase grating at a common point of incidence and from angles of incidence Θ and −Θ respectively, said phase grating having a sinusoidal surface for diffracting said first and second beams into groups of ordered diffracted beams, said sinusoidal surface having a modulation wavelength A for causing a preselected diffracted order q from each said groups of diffracted beams to propagate in a direction normal to said phase grating, said modulation wavelength being determined substantially by the relationship:

$$A = q(\lambda/\sin \Theta),$$

said sinusoidal surface having a modulation depth S which maximizes the energy allocated to said preselected diffracted order q.

2. The apparatus as claimed in claim 1 wherein said angles of incidence equal approximately 45° and −45°, respectively, wherein said preselected diffracted order is the first order, wherein said modulation wavelength equals approximately 1.4142 times the wavelength of said first and second beams, and wherein said modulation depth equals approximately 0.859 times said wavelength of said first and second beams.

3. The apparatus as claimed in claim 1 wherein said apparatus further comprises means for producing said first and second beams.

4. The apparatus as claimed in claim 3 wherein said producing means is at least one laser.

5. A phase grating for combining first and second beams of substantially equal wavelength into a single coherent output beam, said phase grating having a surface with a modulation profile which profile, when said first and second beams intersect at said surface of said phase grating at angles of incidence $\Theta$ and $-\Theta$, respectively, diffracts said first and second beams into first and second groups of ordered diffracted beams, respectively, with a preselected order from each of said first and second groups of ordered diffracted beams propagating in a direction normal to said surface, said modulation profile including a modulation depth which maximizes the energy allocated to said preselected orders.

6. The phase grating as claimed in claim 5 wherein said modulation profile is sinusoidal.

7. The phase grating as claimed in claim 6 wherein said angles of incidence equal approximately 45° and −45°, respectively, wherein said preselected ordered diffracted beams are the first ordered diffracted beams, wherein said modulation profile includes a modulation wavelength approximately equal to 1.4142 times the wavelength of said first and second beams, and wherein said modulation depth equals approximately 0.859 times said wavelength of said first and second beams.

8. The phase grating as claimed in claim 5 wherein said modulation profile is triangular.

9. An apparatus for combining first and second polychromatic beams into an output beam comprising parallel monochromatic beams, said apparatus comprising:

a first blazed grating for diffracting said first polychromatic beam into a first plurality of monochromatic diffracted beams;

a second blazed grating for diffracting said second polychromatic beam into a second plurality of monochromatic diffracted beams; and a phase grating optically aligned to receive the output of said first blazed grating over a first range of angles of incidence and to receive the output of said second blazed grating over a second range of angles of incidence which is the negative of the first range, said phase grating having a modulation profile which further diffracts said first and second pluralities of monochromatic diffracted beams into beams propagating into a common direction.

10. A laser system comprising:

first and second lasers for generating a first and second beams, respectively;

a phase grating; and means for directing said first and second beams to strike said phase grating at a common point of incidence and from said opposite angles of incidence;

said phase grating having a modulation profile which diffracts said first and second beams such that a preselected order of diffraction from each beam propagates in a direction normal to said phase grating and such that a substantial portion of the energies of said first and second beams are allocated to said preselected order.

11. A laser system as claimed in claim 10 wherein said modulation profile is sinusoidal.

12. A laser system as claimed in claim 11 wherein said angles of incidence equal approximately 45° and −45°, respectively, wherein said preselected order is the first order, wherein said modulation profile includes a modulation wavelength approximately equal to 1.4142 times the wavelength of said first and second beams and wherein said modulation profile includes a modulation depth equal to approximately 0.859 times said wavelength of said first and second beams.

13. A laser system as claimed in claim 10 wherein said modulation is triangular.

* * * * *